United States Patent [19]

Sasaki et al.

[11] Patent Number: 5,034,804
[45] Date of Patent: Jul. 23, 1991

[54] ELECTRONIC STILL CAMERA WITH VARIOUS MODES OF DATA COMPRESSION

[75] Inventors: Minoru Sasaki, Tokyo; Masafumi Umeda, Kawasaki; Yoshitomo Tagami; Akihiko Sugikawa, both of Yokohama, all of Japan

[73] Assignee: Kabushiki Kaisha Toshiba, Kawasaki, Japan

[21] Appl. No.: 289,238

[22] Filed: Dec. 23, 1988

[30] Foreign Application Priority Data

Dec. 25, 1987 [JP] Japan .................................. 62-327174

[51] Int. Cl.$^5$ .......................... H04N 5/30; H04N 9/04
[52] U.S. Cl. ...................................... 358/41; 358/209; 358/335; 358/909
[58] Field of Search ............... 358/909, 209, 334, 335, 358/906, 213.16, 213.25, 75, 80, 41, 13, 133

[56] References Cited

U.S. PATENT DOCUMENTS

| | | | |
|---|---|---|---|
| 4,489,351 | 12/1984 | d'Alayer de Costemore d'Arc | 358/209 |
| 4,647,976 | 3/1987 | Nakagaki et al. | 358/909 |
| 4,745,474 | 5/1988 | Schiff | 358/136 |
| 4,758,883 | 7/1988 | Kawahara et al. | 358/909 |
| 4,802,003 | 1/1989 | Takei et al. | 358/13 |
| 4,837,628 | 6/1989 | Sasaki | 358/909 |
| 4,858,026 | 8/1989 | Richards | 358/13 |
| 4,918,523 | 4/1990 | Simon et al. | 358/13 |

FOREIGN PATENT DOCUMENTS

| | | |
|---|---|---|
| 0289944 | 11/1988 | European Pat. Off. . |
| 0218684 | 12/1984 | Japan ................................. 358/335 |
| 62-269581 | 11/1987 | Japan . |
| 0224561 | 9/1988 | Japan . |
| 0284987 | 11/1988 | Japan . |

Primary Examiner—Tommy P. Chin
Attorney, Agent, or Firm—Oblon, Spivak, McClelland, Maier & Neustadt

[57] ABSTRACT

An electronic still camera includes an imaging device, a signal conversion device and a recording device. The imaging device includes a solid state imaging unit and optical color filters of different spectral characteristics arranged on the solid state imaging unit to convert photoelectrically converting the photographed image. The signal conversion device converts a signal from the imaging device into a luminance signal and two color difference signals. The recording device stores image information including the luminance signal and two color difference signals into a semiconductor memory card.

24 Claims, 16 Drawing Sheets

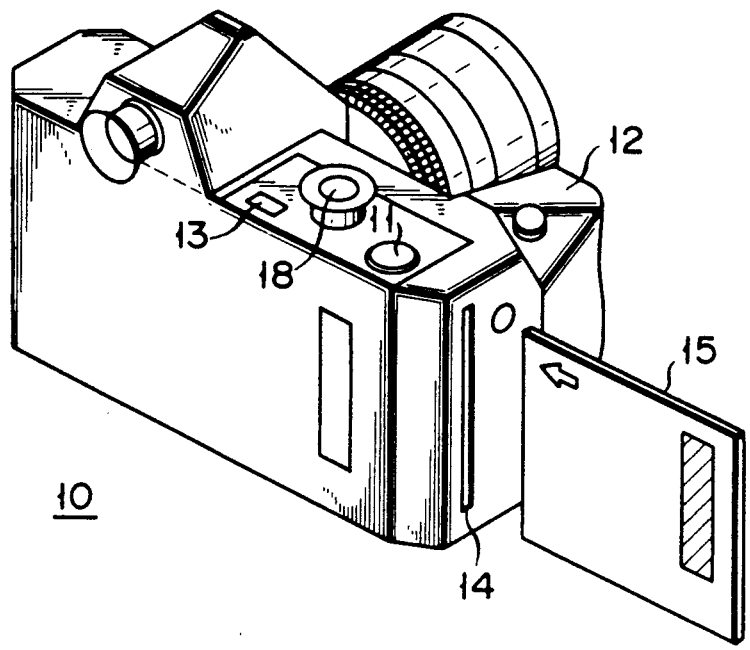
F I G. 1
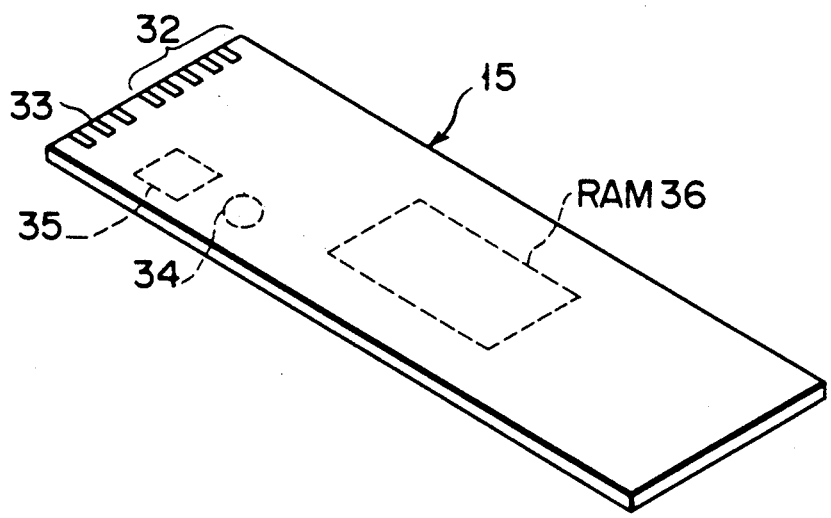
F I G. 3

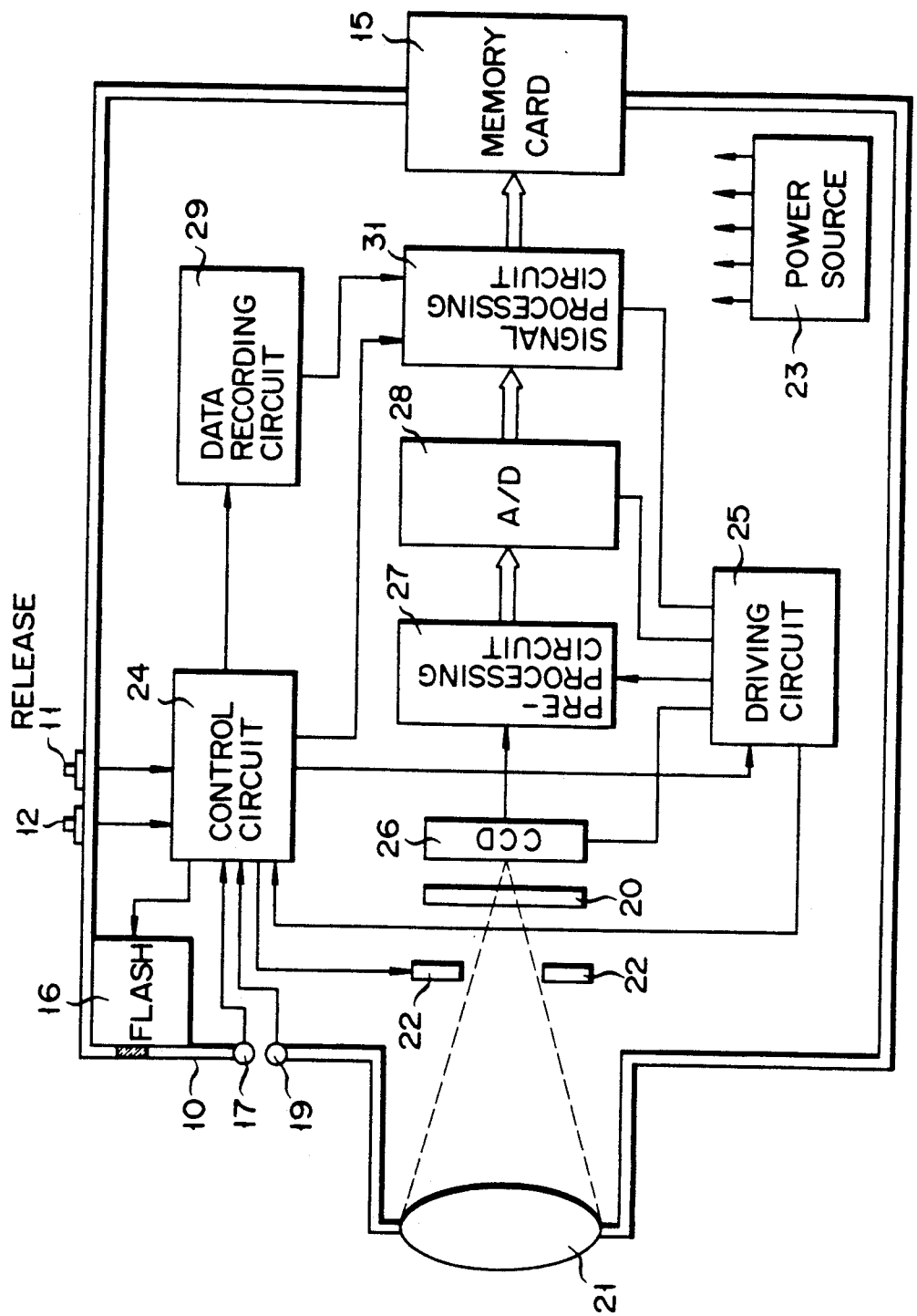
F I G. 2

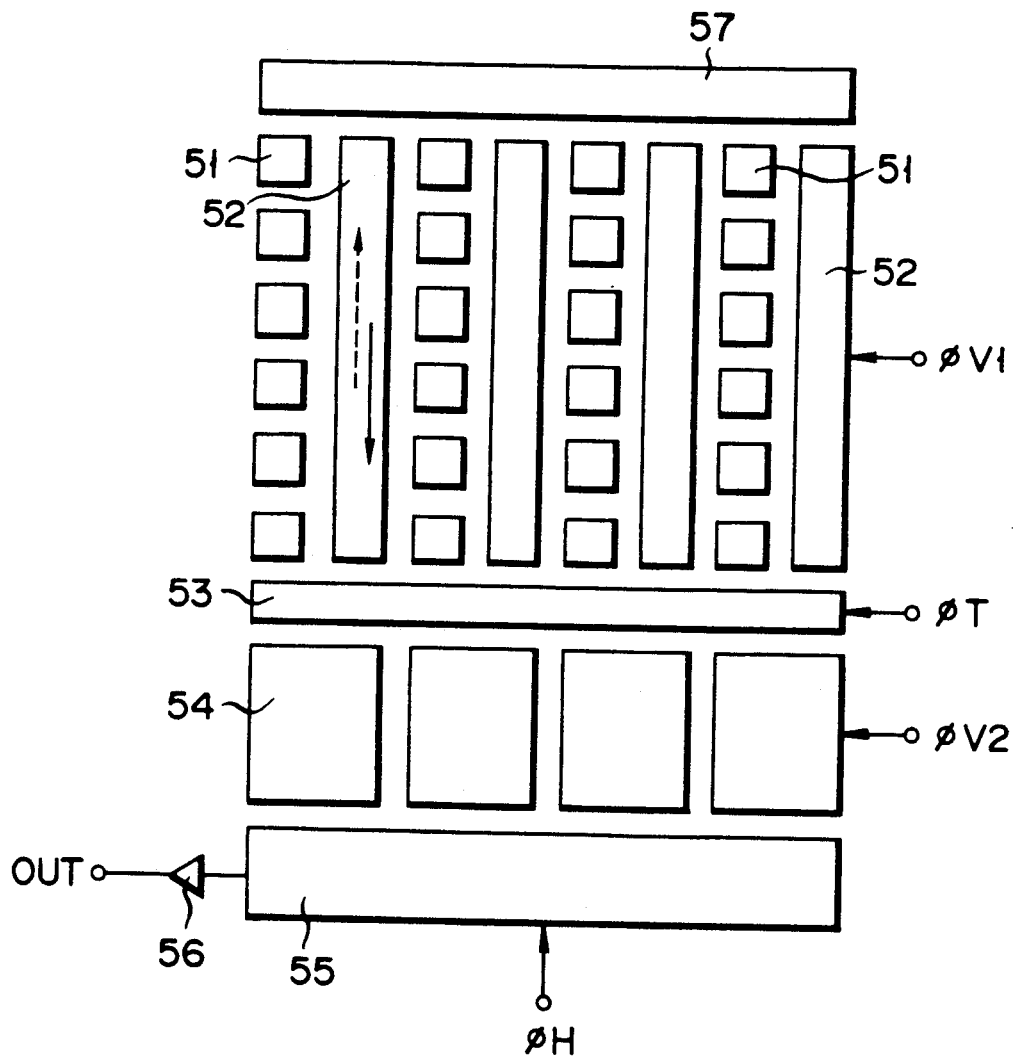
F I G. 5

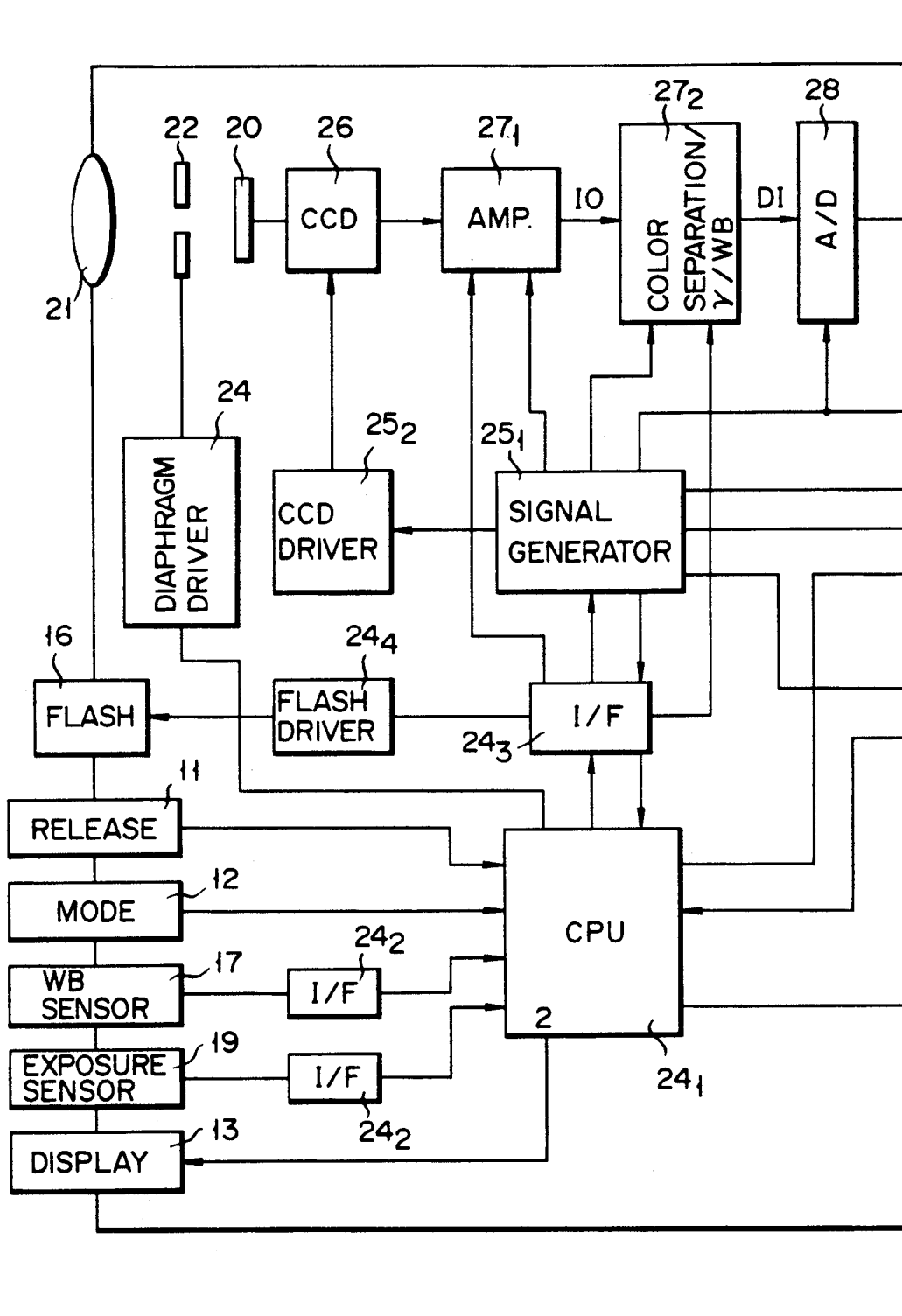
F I G. 6A

FIG. 7

| Y1 | | | |
|---|---|---|---|
| Y11 | Y12 | Y13 | Y14 |
| Y21 | Y22 | Y23 | Y24 |
| Y31 | Y32 | Y33 | Y34 |
| Y41 | Y42 | Y43 | Y44 |

| CR1 | | | |
|---|---|---|---|
| CR11 | CR12 | | |
| CR21 | CR22 | | |
| CR31 | CR32 | | |
| CR41 | CR42 | | |

| CB1 | | | |
|---|---|---|---|
| CB11 | CB12 | | |
| CB21 | CB22 | | |
| CB31 | CB32 | | |
| CB41 | CB42 | | |

FIG. 8

| Y2 | | | |
|---|---|---|---|
| Y11 | Y12 | | |
| Y21 | Y22 | | |
| Y31 | Y32 | | |
| Y41 | Y42 | | |

| CR2 | | | |
|---|---|---|---|
| CR11 | CR12 | | |
| CR31 | CR32 | | |
| | | | |
| | | | |

| CB2 | | | |
|---|---|---|---|
| | | | |
| CB21 | CB22 | | |
| | | | |
| CB41 | CB42 | | |

DIRECTORY

| Bytes | Field | Values |
|---|---|---|
| 1 BYTE | FILE NO. (IMAGE NO.) | |
| | INFORMATION CLASSIFICATION | IMAGE, VOICE, DATA |
| | IMAGING SYSTEM | 525/60, 625/50 |
| | IMAGE MODE | IMAGE COMPRESSION MODE |
| | VOICE MODE | VOICE COMPRESSION MODE |
| | YEAR | |
| | MONTH | |
| | DATE | |
| | HOUR | |
| | MINUTE | |
| 11H | ENTRY BLOCK NO. | |
| 04H | NUMBER OF BLOCKS USED | |

1 DIRECTORY    16 BYTE

NUMBER OF DIRECTORIES    256

F I G. 9B

ELECTRONIC STILL CAMERA WITH VARIOUS MODES OF DATA COMPRESSION

BACKGROUND OF THE INVENTION

1. Field of the Invention

This invention relates to an electronic still camera for recording images on a semiconductor memory card used as a recording medium.

2. Description of the Related Art

Recently, electronic still cameras which use a solid state imaging device, such as a charge coupled device (CCD) for photographing still images of subjects and recording the still images on rotatable magnetic recording medium, are considered to replace conventional still cameras for photographing and recording still images by use of the photosensitivity of photographic films, and they have been merchandised. However, since this type of electronic still camera uses the rotatable magnetic recording medium, a driving unit for driving the rotatable magnetic recording medium relative to the recording head must be provided inside the camera, thus making it difficult to reduce the size of the camera. A solid state electronic still camera system for recording image signals on a memory card using a semiconductor memory has been proposed, as a system which has no driving unit and is suitable for small sized cameras, by the same applicant (Minoru Sasaki U.S. application No. 073,160). An example of this type of electronic still camera is shown in FIG. 13.

An image of the subject is transmitted via lens 121, diaphragm 122 and color filter 120, formed on CCD 126 used as the imaging device in which the image is subjected to the photoelectric conversion. An output signal of CCD 126 is subjected to a predetermined process in pre-processing circuit 127, converted into a digital signal by means of analog-to-digital (A/D) converter 128, and then recorded on memory card 115. In this case, a signal of each picture element of the imaging device is recorded in the digital form on memory card 115. The signal of each picture element of the imaging device is subjected to a predetermined process such as amplification, white-balance correction and $\gamma$ correction as the pre-processing noted above. Picture element data which has been subjected to the pre-processing in a sequence according to the picture element array is recorded on memory card 115. In the reproduction mode, memory card 115 is set in a reproducing unit, and data stored in memory card 115 is subjected to a predetermined signal processing and digital-to-analog (D/A) conversion, and then supplied to a TV (television) monitor which in turn displays the data as an image. In FIG. 13, case 110, release switch 111, battery 123 used as a power source, shutter control circuit 124 for controlling diaphragm 122 and electronic shutter operation, CCD driving circuit 125, and monitoring unit 130 are also shown. CCD driving circuit 125 is used to control and drive shutter control circuit 124, CCD 126, pre-processing circuit 127, A/D converter 128 and memory card 115. Monitoring unit 130 displays the photographed image based on signals transmitted via pre-processing circuit 127 at the time of photographing and is used as a view.

As described above, wherein data corresponding to each picture element of the solid state imaging device is recorded on the memory card, the signal processing is simple and the device is simple in construction. However, if the recording conditions, such as the number of picture elements and the arrangement of color filters of the solid state imaging device of the electronic still camera, are changed, for example, the arrangement of data recorded on the memory card will be changed accordingly. Therefore, the recorded memory card is not interchangeably used for another type of electronic still camera system, that is, an electronic still camera having a different number of picture elements and arrangement of color filters from those of the electronic still camera originally used for recording the image data on the memory card.

If a single electronic still camera is designed so as to record an image under different recording conditions, the recorded memory card may be interchangeably used to some extent. However, in this case, the memory capacity required for recording one frame of image data of the photographed still image varies depending on the recording conditions set at the time of photographing. Therefore, in a case where new image data is written into a recording area in which one frame of image data has been recorded and erased, the memory capacity may some sometimes be insufficient for recording the new image data, thus making it impossible to record the new image data.

SUMMARY OF THE INVENTION

An object of this invention is to provide a new electronic still camera and an image recording method by which a memory card recorded by the electronic still camera of this invention can be used for a desired reproducing unit for image reproduction, the memory capacity required for recording one frame of data can be changed as required, the number of images to be recorded on the memory card can be changed according to the image quality, and new image data can be recorded in a recording area in which one frame of image data has been previously recorded and erased.

In an electronic still camera of this invention, an image signal subjected to the photoelectric conversion by a solid state imaging device is converted into a digital signal by a signal processing circuit and coded and then the coded digital data is recorded on a memory card. Further, in the electronic still camera, the image signal is converted into a luminance signal and two color difference signals which are in turn recorded on the memory card. The luminance signal and two color difference signals may be recorded on the memory card after the total bit capacity thereof for recording one frame of image has been reduced by changing the sampling number and non-linearly quantizing differences between the luminance signal and two color difference signals and corresponding prediction signals to reduce the number of bits required for representing one sampling data. Thus, the number of frames of images to be recorded on the memory card can be changed as required.

Further, the electronic still camera can divide the memory area of the memory card into a plurality of blocks of a preset memory capacity in each of which a block number or name is set, record each frame of data on a plurality or blocks, and record the block number of name of a starting block and the number of blocks used for recording each frame of data. Therefore, even when a memory having different memory capacities for each frame is used, data can be easily written, read out, erased or re-written.

The electronic still camera of this invention effectively solves the problem that the image cannot be restored based on data read out from the memory card because of the difference in the number of picture elements and the arrangement of color filters of the imaging device. Further, the electronic still camera can efficiently change the number of images to be recorded on the memory card according to the picture quality and record the image data of different modes on a single memory card. The electronic still camera can easily erase only one frame of data and record new image data in a corresponding memory area. Therefore, according to this invention, an electronic still camera and an image recording method thereof, which can attain a high versatility of a system including the memory card as the recording medium, can be provided.

BRIEF DESCRIPTION OF THE DRAWINGS

FIG. 1 is a perspective view showing an appearance of an electronic still camera according to an embodiment of this invention;

FIG. 2 is a diagram schematically showing the construction of the electronic still camera shown in FIG. 1;

FIG. 3 is a perspective view illustrating the basic construction of a semiconductor memory card used in the electronic still camera shown in FIG. 1;

FIG. 5 is a diagram showing the modeled construction of a CCD array used in the electronic still camera shown in FIG. 1;

FIGS. 6A and 6B are diagrams showing the detail construction of the electronic still camera shown in FIG. 2;

FIGS. 7 and 8 are views illustrating the sampling points of the image data in the electronic still camera shown in FIG. 1 on the assumption that the positions thereof lie on a 2-dimensional plane;

FIGS. 9A to 9E are views illustrating the recording formats of the memory card used in the electronic still camera shown in FIG. 1;

DETAILED DESCRIPTION OF THE PREFERRED EMBODIMENTS

Figure 4:
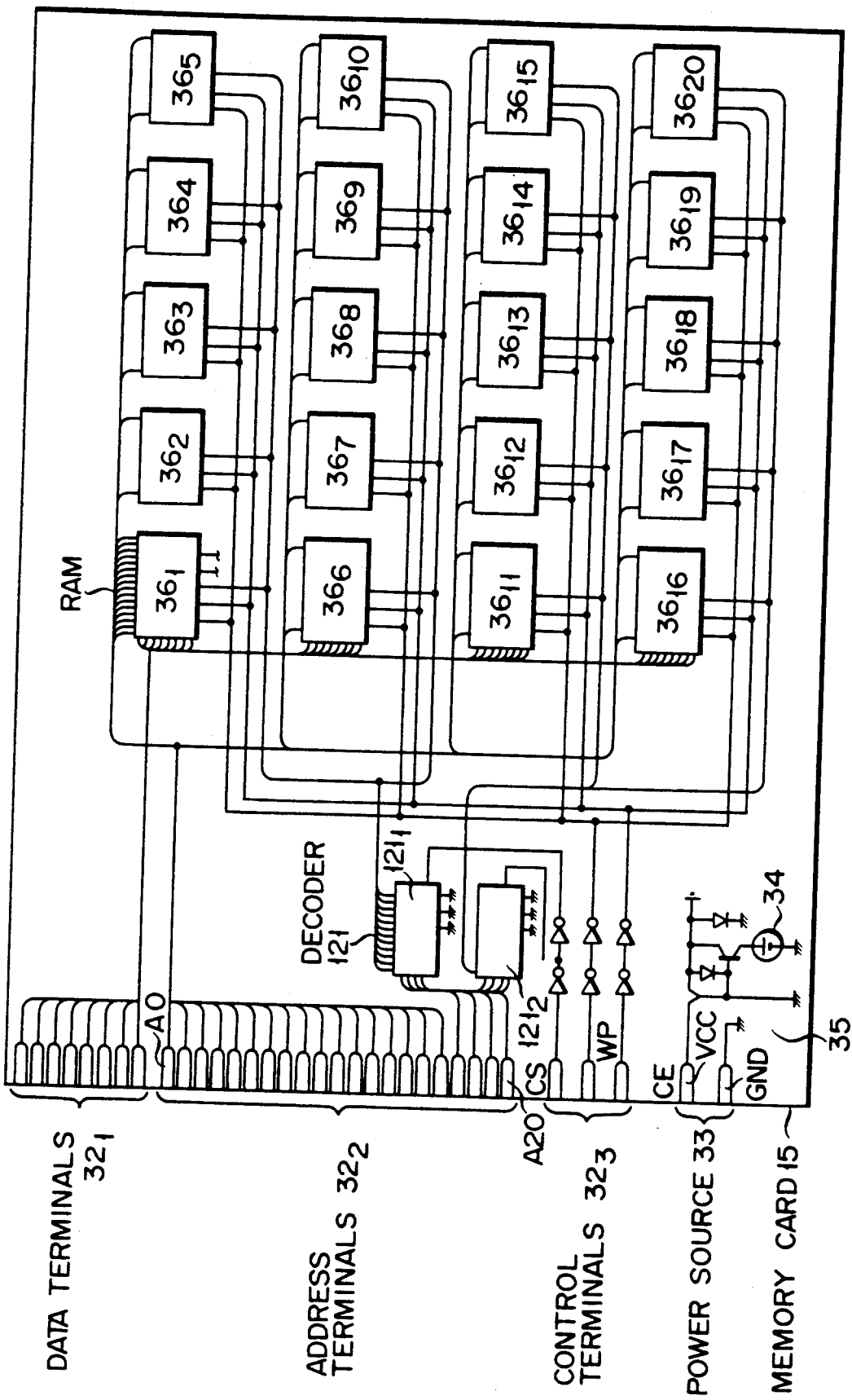
FIG. 4 is a diagram illustrating the detail construction of the memory card shown in FIG. 3.

There will now be described an electronic still camera according to an embodiment of this invention with reference to the accompanying drawings.

An electronic still camera system as used hereinafter is defined as including, an electronic still camera and a reproducing unit. The electronic still camera is used to take a picture of a subject and record the image on a semiconductor memory card used as recording medium, and the reproducing unit is used to read out image information from the memory card and transfers the image information to TV receiver or the like for display.

FIG. 1 is a perspective view of the electronic still camera as viewed from the rear upper point thereof, the explanation of portions of the electronic still camera which have the same functions as those of an ordinary still camera (using a photographic film) being omitted. Electronic still camera 10 includes release 11, photographing mode switch 12 and photographed picture number displaying unit 13. Further, insertion slot 14 is provided for permitting insertion of semiconductor memory card 15 on the right side of electronic still camera 10. Shutter speed selection dial 18 is disposed on the upper surface of electronic still camera 10. These elements will be described in more detail later.

FIG. 2 schematically shows the basic construction of electronic still camera 10. In the photographing operation, focusing is effected by means of lens system 21 and the shutter speed is adequately set by operating shutter speed selection dial 18 in the same manner as in the ordinary still camera. Diaphragm 22 is controlled by means of control circuit 24, and the shutter speed is adjusted by a so-called electronic shutter. The electronic shutter adjusts the shutter speed by controlling the charge storing time in CCD array 26 used as an imaging device. An image of a subject is formed on CCD array 26 via lens system 21.

When the photographing operation is started and release 11 is set into the halfway position (the release button is depressed halfway) by an operator or user, the power source voltage from power source 23 using a battery is supplied to the respective electronic circuit sections. The amount of incident light is measured by exposure sensor 19, and control circuit 24 controls diaphragm 22 according to the measured amount of incident light. The external color temperature is measured by white balance sensor 17, and control circuit 24 generates a white balance control signal according to the measured color temperature.

When release 11 is further depressed from the halfway position to the fully depressed position (the release button is fully depressed), control circuit 24 produces a shutter pulse. In response to the shutter pulse, driving circuit 25 supplies control signals to CCD array 26, pre-processing circuit 27, A/D conversion circuit 28 and signal processing circuit 31 which are in turn operated in response to the respective control signal. An image information signal formed of an analog signal from CCD array 26 is supplied to A/D conversion circuit 28 via pre-processing circuit 27 and is converted into a corresponding digital signal. The image information signal thus converted into the digital form is subjected to a predetermined signal processing by signal processing circuit 31. A digital image information signal from signal processing circuit 31 is supplied to semiconductor memory card 15 together with a control signal with an address signal. In this way, the image information signal corresponding to the photographed still image is stored in semiconductor memory card 15.

Prior to the photographing, the user can selectively set the format of data to be stored in semiconductor memory card 15 by operating mode switch 12. Mode switch 12 is used to select and set a desired one of a plurality of modes for different image qualities. Mode selection by mode switch 12 makes it possible to change the amount of digital data required for storing one frame image, i.e., the number of image frames which can be stored in one memory card 15. For example, when mode "1" or high image quality mode is set, one frame image is stored as digital data of 640 Kbytes with the highest image quality. When mode "2" is set, one frame image is stored as digital data of 320 Kbytes with the second highest image quality, and when mode "3" is set, one frame image of 160 Kbytes is stored with the third highest image quality. Further, when mode "4" or low image quality mode is set, one frame image of 80 Kbytes corresponding to the smallest memory space for one frame is stored. If memory card 15 is provided with a memory of 2.56 Mbytes, for example, it is possible to store 4, 8, 16 and 32 frames into one memory card 15 in modes "1", "2", "3"and "4", respectively. The operation will be described later.

FIG. 3 shows the basic construction of memory card 15. Memory card 15 is constituted by a printed circuit board having a plurality of random access memory (RAM) chips 36 mounted thereon. External terminals including data terminals, address terminals and control terminals, and power source terminals 33 are provided on one side of memory card 15. For use of memory card 15, it is inserted into electronic still camera 10 or a reproducing unit. Supply of the power source voltage to memory card 15 is achieved via power source terminals 33, and transfer of signals with respect to memory card 15 is effected via external terminals 32. Exclusive battery 34, used for maintaining stored data, is built in memory card 15. Further, memory card 15 includes power source switching circuit 35 which switches the power source of RAM chip 36 from built-in battery 34 to power source 23 of electronic still camera 10 or the power source of the reproducing unit when memory card 15 is inserted into electronic still camera 15 or the reproducing unit.

FIG. 4 shows an example of memory card 15 having 20 1M-byts RAM chips $36_1$ to $36_{20}$. External terminals $32_1$ to $32_3$ and power source terminals 33 are provided on one side of memory card 15. External terminals $32_1$ to $32_3$ include 8-bit data terminals $32_1$, address terminals $32_2$ for receiving address information A0 to A20 and control terminals $32_3$. Memory card 15 of FIG. 4 has a memory capacity of 20 Mbytes (2.56 Mbytes). Control terminals $32_3$ include terminal CS for selection of RAM chips 36, write pulse terminals WP and card selection terminals CE for selecting one of cards when a plurality of cards are used. One of decoders $121_1$ and $121_2$ is selected by an input supplied to terminals CS. Decoders $121_1$ and $121_2$ respectively correspond to RAM chips $36_1$ to $36_{10}$ and $36_{11}$ to $36_{20}$.

CCD array 26, which is a solid state imaging device, is used as an imaging device for photographing still frame images, for example. A frame interline type CCD may be suitable for the CCD array 26 used in the electronic still camera of this invention, for example.

FIG. 5 shows the modeled construction of one example of a frame interline type CCD solid state imaging device.

The CCD array has image receiving portions 51 formed of photoelectric conversion elements such as photodiodes arranged in a matrix form. Vertical transferring portions 52 are arranged along and adjacent to the columns of image receiving portions 51. Charges in each of image receiving portions 51 are transferred to a corresponding one of vertical transferring portions 52 in response to field shift pulse $\phi v1$, and then transferred from one end thereof to charge storage section 54 acting as a frame memory section via transfer gate 53. Signal charges in charge storage section 54 are transferred to output circuit 56 via horizontal transferring section 55 and then output as an electrical signal. Drain portion 57 is arranged adjacent to the other ends of vertical transferring sections 52.

In a case where only one CCD array of this type is used to derive out a color image signal, an optical color filter for separating light components of red (R), green (G) and blue (B) is disposed on each image receiving portion 51. Various types and arrangements of the optical color filters are known in the art, and any type and arrangement may be used in the electronic still camera of this invention.

Figure 6B:
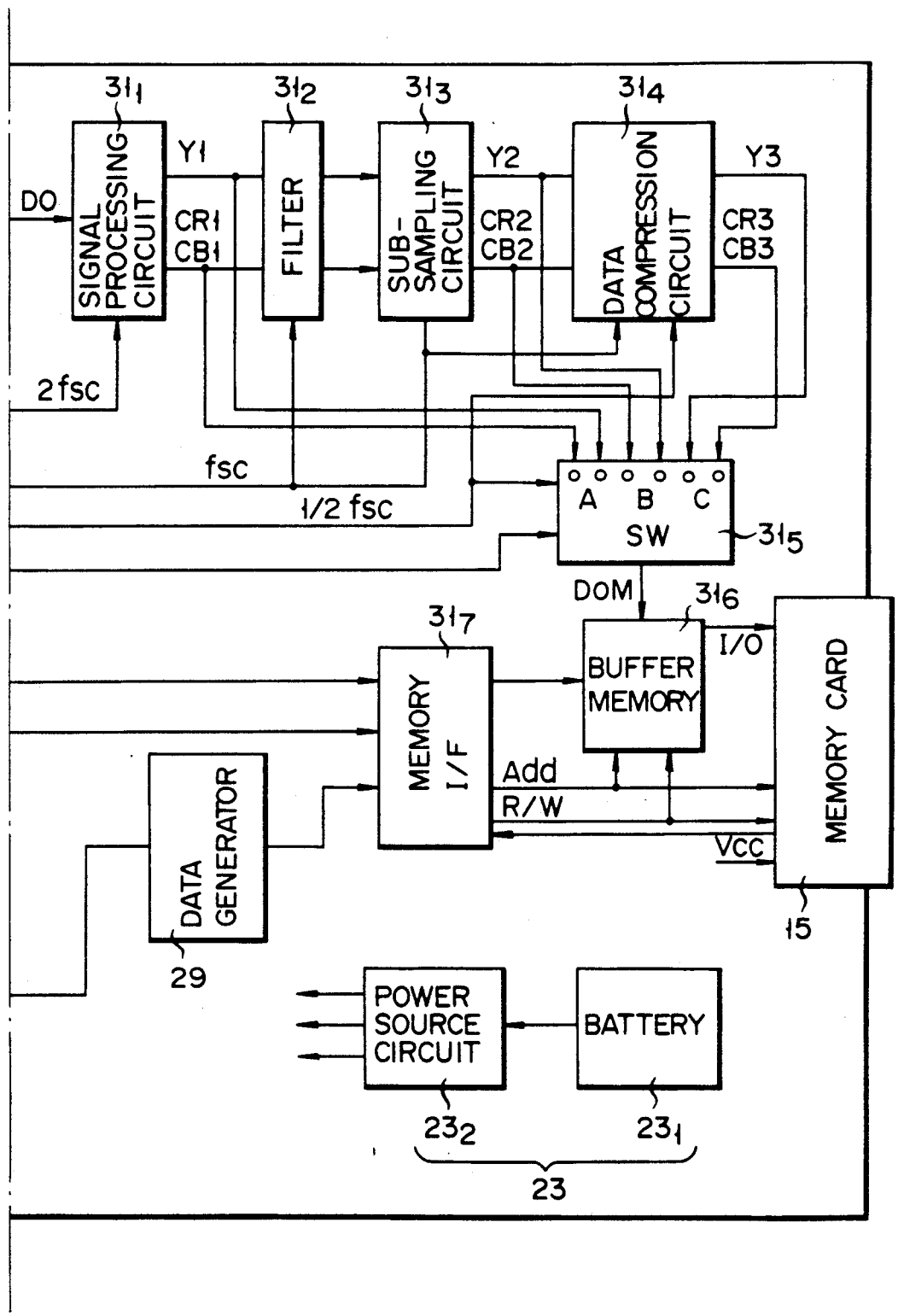

Referring to FIGS. 6A and 6B, electronic still camera 10 of this invention is explained in more detail.

The user can select a desired mode by operating mode switch 12 prior to the operation of release 11 by taking the quality of image stored in the memory card and the number of frames stored in the memory card into consideration. A selected mode signal is supplied from central processing unit (CPU) $24_1$ to switch $31_5$.

When release 11 is depressed halfway, information of external color temperature and the information of light exposure are supplied from white balance sensor 17 and exposure sensor 19 to CPU $24_1$ via interface (I/F) $24_2$. CPU $24_1$ controls diaphragm driving circuit $24_5$ in response to the information of light exposure so as to drive diaphragm 22. Further, CPU $24_1$ controls CCD driving circuit $25_2$ via I/F $24_3$ and signal generator $25_1$ according to the information of white balance and light exposure so as to drive CCD array 26. Flash driving circuit $24_4$ is controlled by a signal supplied from CPU $24_1$ via I/F $24_3$, and it is determined whether or not flash 16 such as an electronic flash should be driven by flash driving circuit $24_4$ at the photographing time. Amplifier circuit $27_1$ and color separation·$\gamma$ correction·white balance circuit $27_2$ are each controlled by a signal supplied from CPU $24_1$ via I/F $24_3$ and a signal supplied CPU $24_1$ via I/F $24_3$ and signal generator $25_1$.

When release 11 is further depressed to a fully depressed position, signal generator $25_1$ supplies respective driving signals to CCD array 26, amplifier $27_1$, color separation·$\gamma$ correction·white balance circuit $27_2$, A/D conversion circuit 28, signal processing circuit $31_1$, filter $31_2$, sub-sampling circuit $31_3$, data compression circuit $31_4$, switch $31_5$, and memory interface (memory I/F) $31_7$.

An image information signal is output from CCD array 26 in response to the above described operation of release 11. The image information signal is amplified to a preset level by amplifier $27_1$, and R, G and B signals are supplied in parallel to A/D conversion circuit 28 via color separation·$\gamma$ correction·white balance circuit $27_2$ including a color separation circuit, white balance circuit and $\gamma$ correction circuit. R, G and B digital signals output in parallel from A/D conversion circuit 28 are converted into luminance signal Y1 and color difference signals CR1 and CB1 by signal processing circuit $31_1$, and color difference signals CR1 and CB1 are supplied to low-pass filter $31_2$ after the sampling number thereof is reduced to one half. In this case, luminance signal Y1 is supplied to low-pass filter $31_2$ with the sampling number kept unchanged. Thus, luminance signal Y1 and color difference signals CR1 and CB1 are obtained as linearly quantized data with each sampled value represented by 8 bits. FIG. 7 shows the relation between the sampling points of luminance signal Y1 and those of color difference signals CR1 and CB1. Low-pass filter $31_2$ is a pre-low-pass filter for sub-sampling. Luminance signal Y1 and color difference signals CR1 and CB1 are supplied to sub-sampling circuit $31_3$ via low-pass filter $312$. In sub-sampling circuit $31_3$, luminance signal Y1 is subjected to a line-offset sampling process and converted into luminance signal Y2 whose sampling number is reduced to one half, and color difference signals CR1 and CB1 are sampled in every other line and converted into color difference signals CR2 and CB2 whose sampling number is reduced to one half. FIG. 8 shows the relation between the sampling data points of the signals. Luminance signal Y2 and color difference signals CR2 and CB2 are supplied to data compression circuit $31_4$. As described before, luminance signal Y2 and color difference signals CR2 and CB2 are linearly quantized using 8 bits for each sampled value, but the data bit number for each sampling value is reduced in data compression circuit $31_4$. In this embodiment, differential pulse code modulation (DPCM) is used, for example, as the data compression system to effect the data compression. The data compression by DPCM is well known in the art, each sampling data is quantized by nonlinearly compressing a difference between the sampling data and receding sampling data. For example, in the case of luminance signal Y12 of FIG. 8, a difference between luminance signals Y11 and Y12 is non-linearly quantized, and each sampling value is represented by 4 or 2 bits. Likewise, color difference signals CR1 and CB1 are compressed and each sampling value is represented by 4 or 2 bits. The luminance signal thus compressed is denoted by Y3, and the color difference signals thus compressed are denoted by CR3 and CB3.

Switch $31_5$ is used to select the luminance signal and color difference signals according to the set mode. In a case where mode (A) is set, for example, signal Y1, CR1 and CB1 supplied from signal processing circuit $31_1$ are selected by switch $31_5$ and stored into memory card 15 via buffer memory $31_6$. Buffer memory $31_6$ can store at least one frame of data. Likewise, in mode (B), signals Y2, CR2 and CB2 supplied from sampling circuit $31_3$ are selected by switch $31_5$, in mode (C), signals Y3, CR3 and CB3 compressed by data compression circuit $31_4$ to represent each sampling value by 4 bits are selected by switch $31_5$, and in mode (D), signals Y3 CR3 and CB3 compressed by data compression circuit $31_4$ to represent each sampling value by 2 bits are selected by switch $31_5$. The signals selected by switch $31_5$ are stored in memory card 15 via buffer memory $31_6$.

In addition to image data, information relating to the selected mode is also stored into memory card 15 together with the image data. (For example, in modes (A) and (B), "001" and "010" are stored in the form of binary code indicating the selected mode numbers).

For example, it is also possible to store imaging data, such as data relating to use of the flash, white balance control data, exposure data (or aperture data) and shutter speed data, in the form of binary code as well as the selected mode. The imaging data is displayed on display unit 13 by the control of CPU $24_1$, thereby permitting the user or operator to recognize the imaging data by observing display unit 13.

A method of storing data into memory card 15 is explained in detail with reference to FIGS. 9A to 9E. In this example, a memory card of 20 Mbits or 2.56 Mbytes which has 20 RAMs or static RAMs (SRAM) of 1 Mbits mounted thereon as shown in FIG. 4 is used.

Figure 9A:
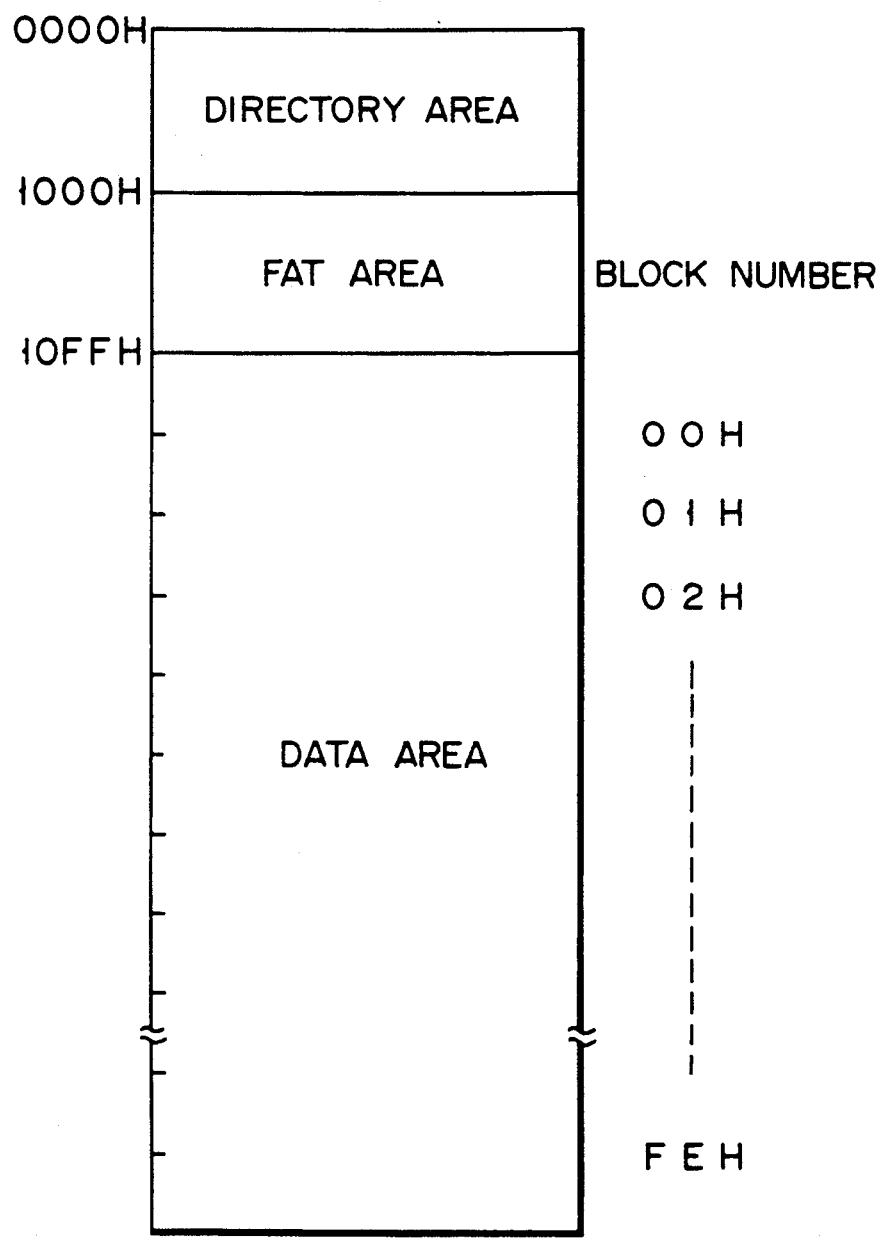
Figure 9C:
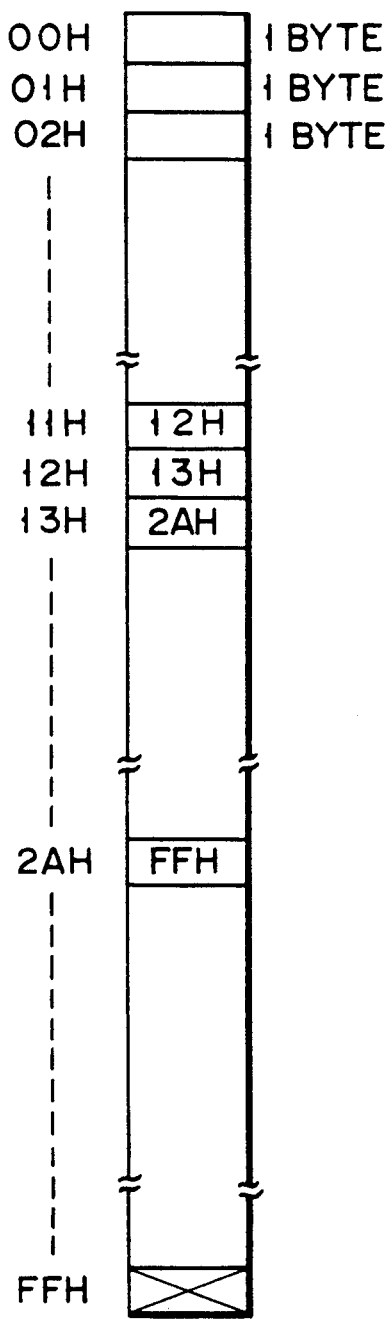
Figure 9D:
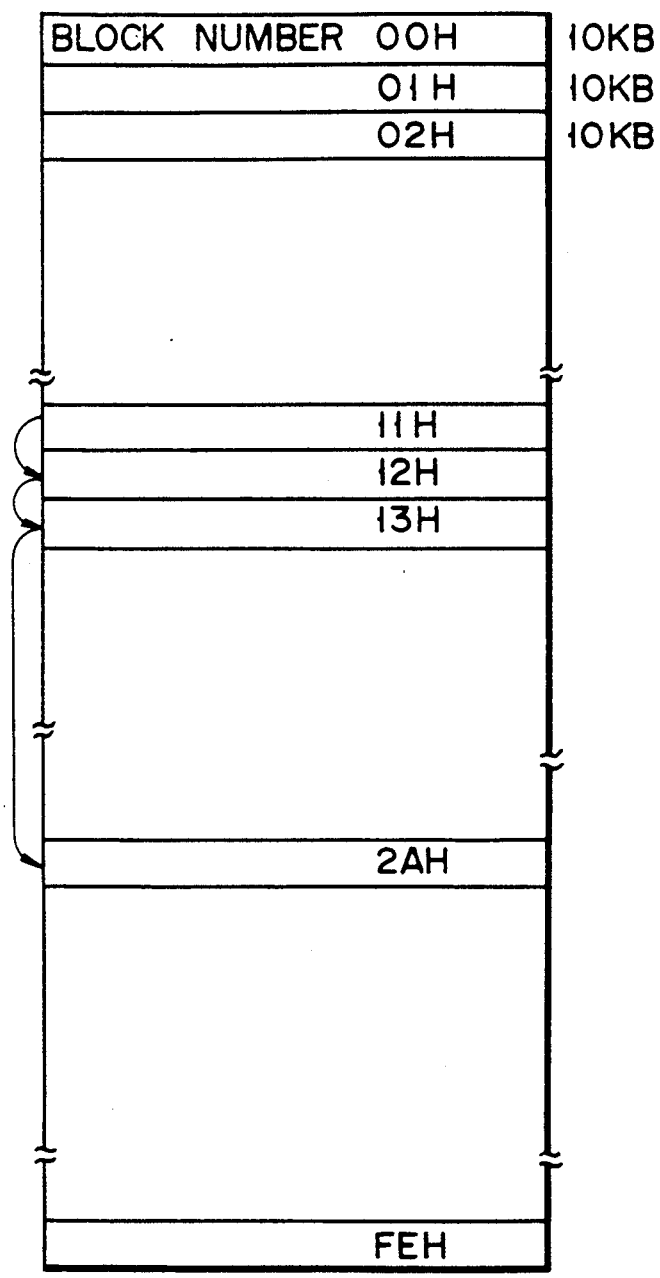

As shown in FIG. 9A, all the memory space is divided respectively into directory area, a file allocation table (FAT) and a data area. As shown in FIG. 9B, there are stored in the directory area various items of 1-byte information which include information indicating a file number or image (frame) number in the case where the file is image data; information indicating data classfication or the classification of image data, voice data or other data; information indicating the imaging system, that is, the 525 (lines)/60 (fields) system or 625 (lines)/50 (fields) system in the case of image data; information indicating the imaging mode or image compression method (including the case where on data compression is effects); information indicating the voice mode or compression method in the case of voice data; information indicating the year in which the recording or photographing was effected; information indicating the month in which the recording was effected; information indicating the date on which the recording was effected; information indicating the hour at which the recording was effected; and information indicating the minute at which the recording was effected. Further, the entry block number of the file (image data file) and the number of data blocks used for storing the file are stored into the directory area. The directory area has 16 bytes for each file, and 256 files (256 frames in the case of image data) are allotted thereto. As a result, the directory area has a memory capacity of 4 Kbytes. FIGS. 9C and 9D respectively show the FAT area and data area. 256 bytes are allotted to the FAT area, and addresses from 00H to FFH are assigned thereto. The data area is divided into blocks each having 10 Kbytes, and block numbers 00H to FFH are assigned to the respective blocks.

Figure 9E:
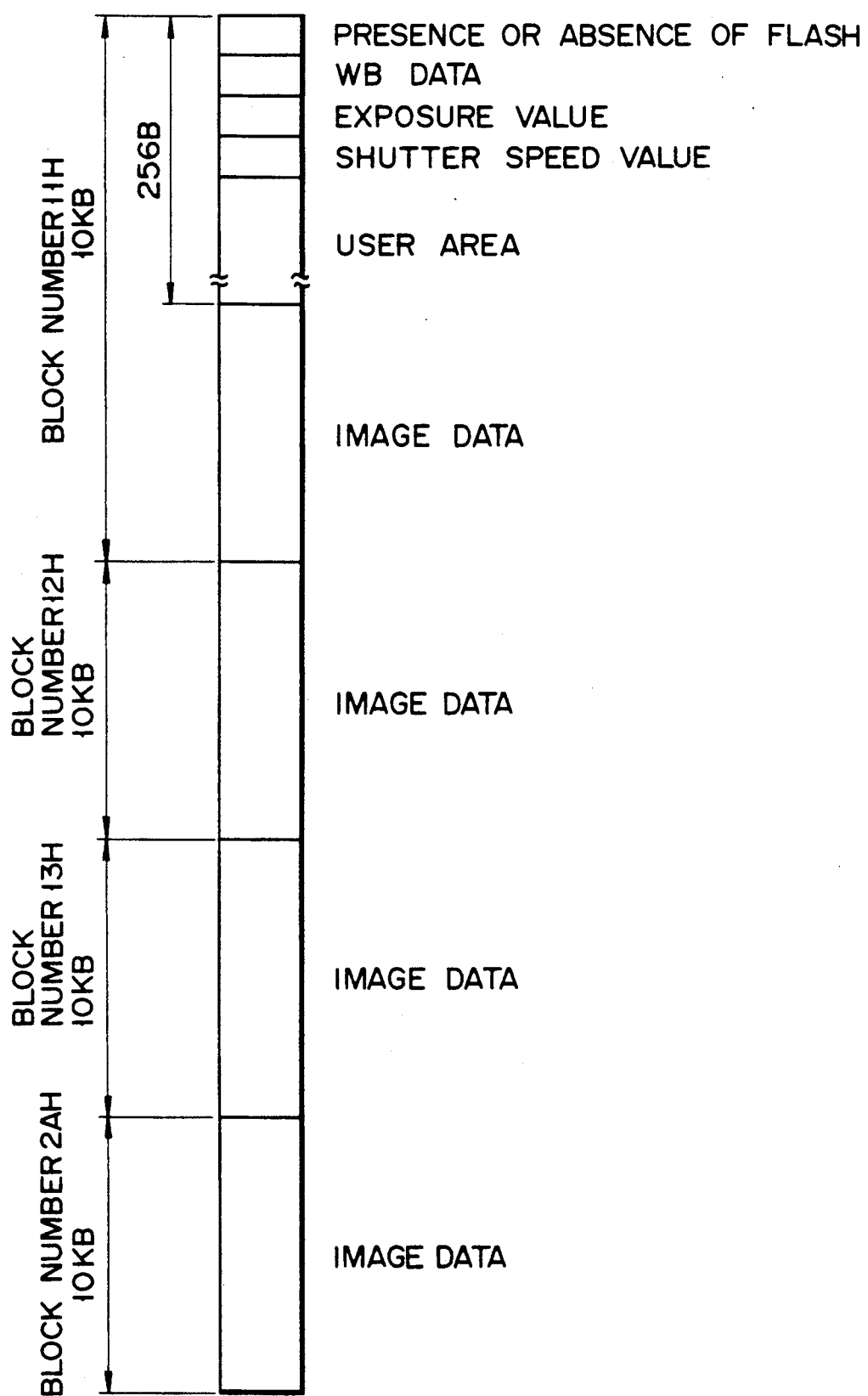

In order to clarify the explanation, assume that approx. 40 Kbytes are necessary to store one frame data, for example. Then, the entry block number or 11H and the number of available blocks of 04H are written into the directory area, for example. 12H, 13H, 2AH and FFH are written into addresses 11H, 12H, 13H and 2AH. Image data of one frame is written into a 40-Kbyte area obtained by linking block numbers 11H, 12H, 13H and 2AH of the data area. FFH written into the address of 2AH of the FAT area indicates the last block. FIG. 9E shows the 40-Kbyte memory area obtained by linking the blocks. In the first block or 256-byte block of block number 11H, data indicating the presence or absence of the flash (or information as to whether the flash has been used or not), white balance data, and photographing condition data including the exposure value (or aperture value) and shutter speed are recorded, and the remaining 252-byte area is used as a user area for recording the title, for example. Image data may be successively recorded in an area from 257th byte to block number 2AH. 64 blocks, 32 blocks, 16 blocks and 8 blocks are used respectively in modes (A), (B), (C) and (D).

In this method, when a variable length coding system in which the memory capacity for each frame attained after the coding operation may be varied is used, data can be recorded on the memory card without causing any problem. That is, after the coding operation, data is temporarily stored in buffer memory $31_6$. The memory capacity necessary for storing one frame data is determined according to the application condition of buffer memory $31_6$, and therefore it is possible to calculate the number of data blocks to be used. When the number of available data blocks is not sufficient, the image data is kept stored in buffer memory $31_6$ and the next photographing is inhibited until a new memory card is set.

Figure 10:
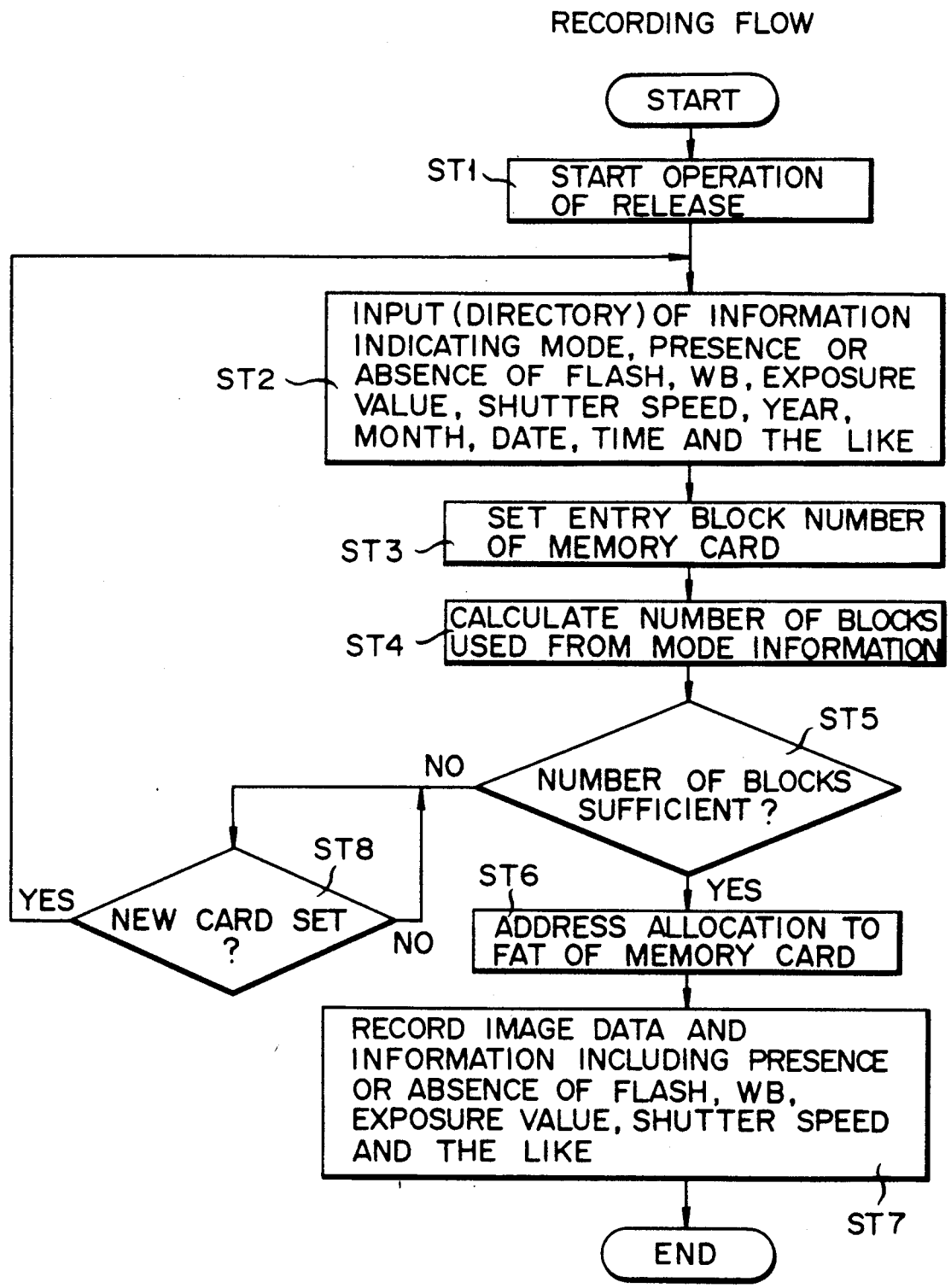
FIG. 10 is a flowchart showing the process in detail at the time of photographing effected by the electronic still camera shown in FIG. 1.

Now, the processing for effecting the above recording operation is explained in detail with reference to FIG. 10 showing the flowchart.

When an operation input of release 11 determining the photographing timing is supplied (step ST1), the photographing information to be written into the directory area of memory card 15 and directory information of memory card 15 set in the device are fetched (step ST2). The photographing information includes mode information, information indicating the presence or absence of the flash, white balance information, information indicating the exposure value (or aperture value), shutter speed information, year information, month information, date information and time information. The entry block number of memory card 15 is determined based on the above information (step ST3). Further, the number of data blocks used to store image to be photographed is determined based on the mode information (step ST4). The available memory capacity of memory card 15 is checked. In a case where it is detected that a sufficient number of data blocks for recording an image cannot be obtained in memory card 15 (step ST5), necessary information is displayed on display unit 13 or alarm is sounded, for example, to inform the user that memory card 15 should be replaced, and, at the same time, one frame of data is stored in buffer memory $31_6$. If a new memory card is set (step ST8), step ST2 is effected again. In a case where a sufficient number of data blocks for recording an image are available in memory card 15 set in the device (step ST5), address allocation to the FAT in memory card 15 is effected (step ST6) and image data and photographing data, which have been stored in buffer memory $31_6$, are stored in memory card 15 (step ST7).

Figure 11:
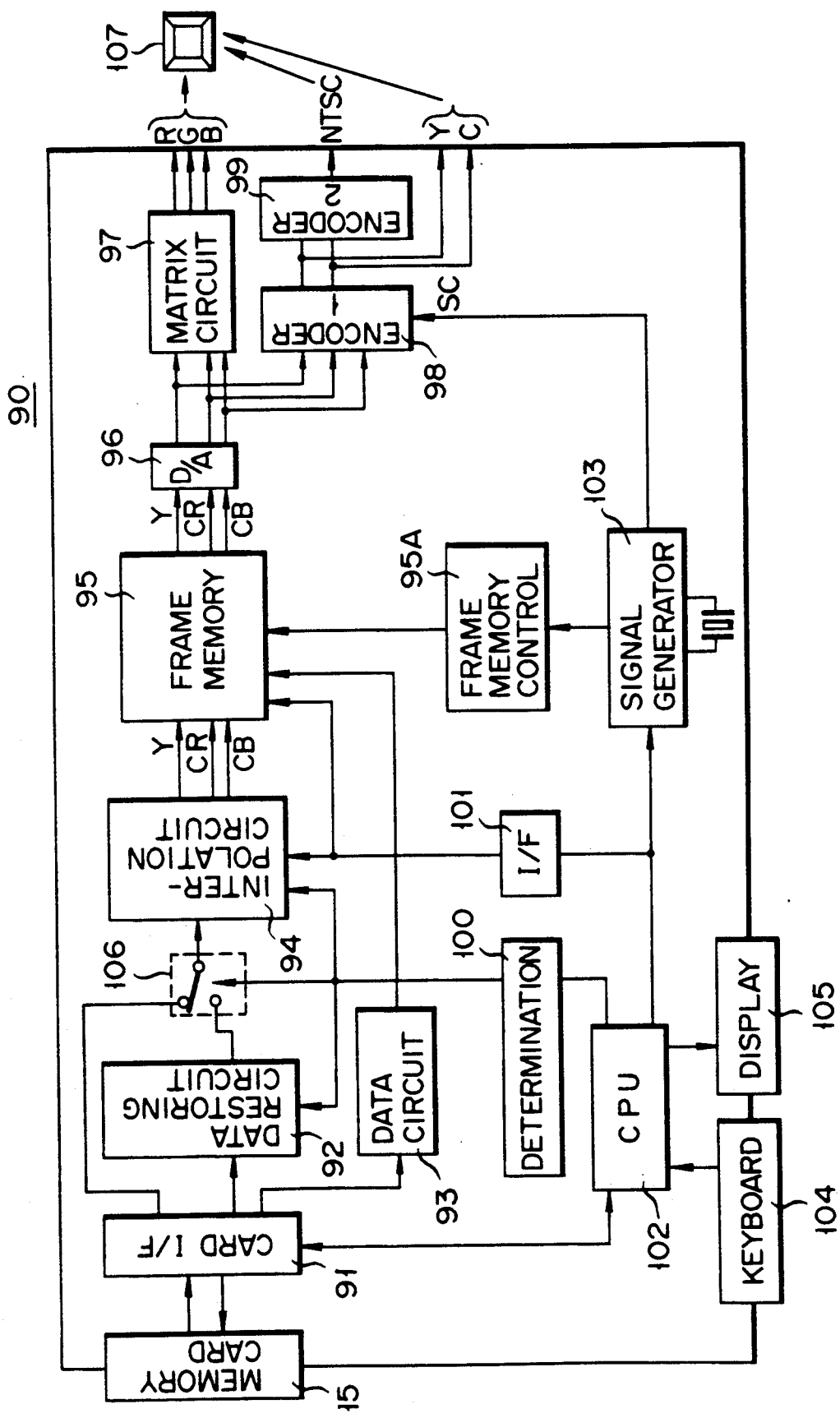
FIG. 11 is a block diagram showing the schematic construction of a reproducing unit for reproducing an image from the memory card recorded by the camera of this invention.

Next, the reproducing unit for reading out the image data from memory card 15 and displays video image on a TV monitor or the like is explained with reference to FIG. 11.

When memory card 15 is inserted into reproducing unit 90 and keyboard 104 is operated to specify a file number (image number), then CPU 102 reads out information from the directory area in the memory card via card interface (card I/F) 91. CPU 102 determines whether the information classification of the specified file number is image data or not, the type of imaging system, and the type of compression mode. At the same time, CPU 102 determines the entry block number. The, CPU 102 reads out information of all the block numbers from the FAT area. After block numbers are supplied to card I/F 91, by means of CPU 102, it supplies addresses corresponding to the received block numbers so as to read out image data for each byte. Further, CPU 102 controls the signal processing operation based on information of the imaging system and mode which has been previously read out. For example, when the mode is mode (C), data compressed into 4-bit data is restored into 8-bit linearly quantized data by use of data restoring circuit 92, and if the mode is mode (D), 2-bit data is restored into 8-bit data. In the case of modes (A) and (B). the readout image data is input to interpolation circuit 94 without being supplied to data restoring circuit 92. Luminance signal Y1 and two color difference signals CR and CB are output from interpolation circuit 94 and one frame data is written into frame memory 95. In the case of mode (C) or (D), the image data is written into frame memory 95 via data restoring circuit 92 and interpolation circuit 94.

The above signal processing is controlled according to the modes as will be described below.

A mode signal output from card I/F 91 is input to determination circuit 100 via CPU 102, and the mode is determined by means of determination circuit 100. The switching position of switch 106 is set according to the result of the determination in determination circuit 100, and at the same time, the operation of data restoring circuit 92 and interpolation circuit 94 is changed and controlled according to the determination result.

Further, data other than the image data output from card I/F 91 is stored into frame memory 95 via data circuit 93 in the same manner as the image data. After one frame data is written into frame memory 95, a readout clock is supplied from signal generator 103 to memory 95 via frame memory control section 95A and then luminance signal Y and color difference signals CR and CB are read out from the memory. Luminance signal Y and color difference signals CR and CB are converted into an analog signal by means of digital-analog (D/A) converter 96. If an input method of TV monitor 107 is an RGB (red, green and blue) input method, analog R, G ad B signals are formed in matrix circuit 97 and supplied to TV monitor 97. If the input method of TV monitor 107 is an NTSC composite input method, luminance signal Y and color difference signals CR and CB converted into the analog form are converted into a composite signal by use of first encoder 98 and second encoder 99 and then supplied to TV monitor 107. If the input method of TV monitor 107 is a Y-C separation input method, luminance signal Y and color difference signals CR and CB converted into an analog form are converted into luminance signal Y and color difference signals C by means of first encoder 98 and then supplied to TV monitor 107.

As described above, the photographed image stored in memory card 15 can be displayed. Of course, it is possible to obtain a hard copy if output terminals such as R, G and B output terminals are connected to a video printer.

In the system of this invention, recorded images can be erased for each frame. The operation of erasing the image for each frame is effected as follows.

When keyboard 104 of the reproducing unit is operated to specify the image number so as to issue an erasing command, CPU 102 search the directory area of memory card 15 via card I/F 91 to detect the image number (file number) corresponding to the specified image number. When the specified image number is detected, FFH is written into areas of a corresponding directory image number, entry block number and the number of blocks to be used. Further, the memory contents of the address used in the FAT area is erased (00H is written into all the corresponding addresses).

In the electronic still camera, when one image frame is additionally recorded, the FAT area is searched (by CPU $24_1$) and address in which 00H is written is detected. The lowest one of addresses in which 00H is written is set as an entry block number, and the number of necessary blocks based on the memory capacity required for storing one frame and address for linking the blocks is written into the FAT area. Next, data of information classification and file number is written into one of vacant directories (file number is FFH), and the entry block number and the number of blocks used are written into the last two words. After this, image data and photographing condition data such as the presence or absence of the flash are sequentially stored into the linked blocks. If it is detected as the result of the searching of the FAT area that the number of blocks is not large enough to record the image, a signal indicating that the photographing cannot be effected is generated to display an alarm indicating the write unable condition on display unit 13. The alarm may be displayed by a light emitting diode (LED).

In the above example, each block is formed of 10 Kbytes. However, in a case where it is desired to more finely adjust the memory capacity required for recording one frame image data, the size of each block can be reduced or the minimum memory capacity required for recording one frame may be set as one block.

Further, luminance signal Y and two color difference signals CR and CB are used. However, it is possible to use (R-Y) and (B-Y) signals as the color difference signals. These signals Y, (R-Y) and (B-Y) can be easily derived from signals R, G and B as follows.

$$Y = 0.30R + 0.59G + 0.11B$$

$$B - Y = 0.70R - 0.59G - 0.11B$$

$$B - Y = -0.30R - 0.59R + 0.89B$$

Likewise, signals I and Q used in an NTSC color system can be utilized as two color difference signals.

In the above example, data compression is effected by use of DPCM to reduce the memory capacity for one sampling value. However, there are various types of data compression methods in which different methods of forming prediction signals are used, different methods of selecting non-linear quantizes are used, or a transform coding method is used. Any one of the data compression methods can be used only if information indicating the data compression method used is stored in the memory card as the mode information in the form of binary data.

Figure 12A:
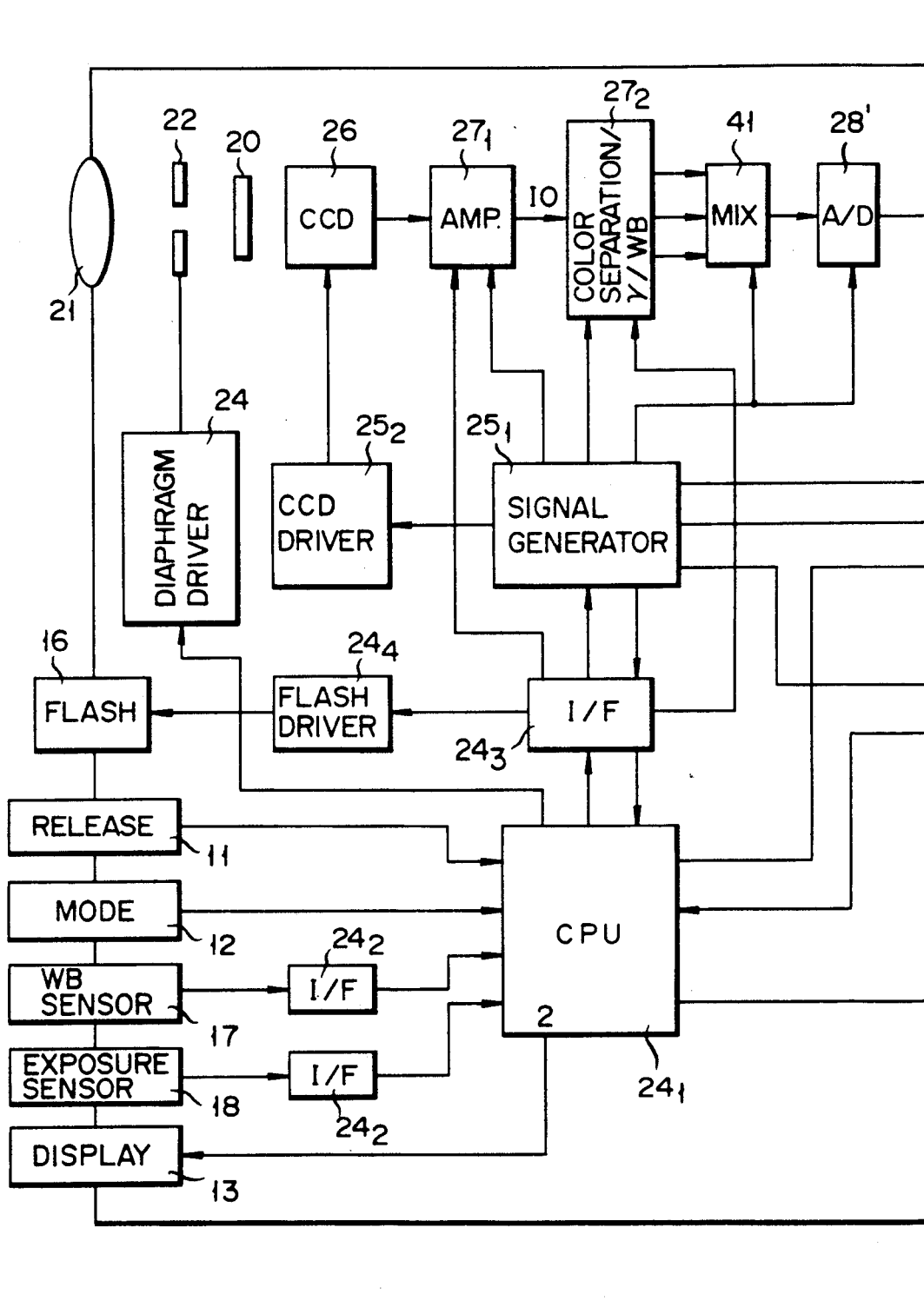
FIGS. 12A and 12B are block diagrams showing the detail construction of an electronic still camera according to another embodiment of this invention.
Figure 12B:
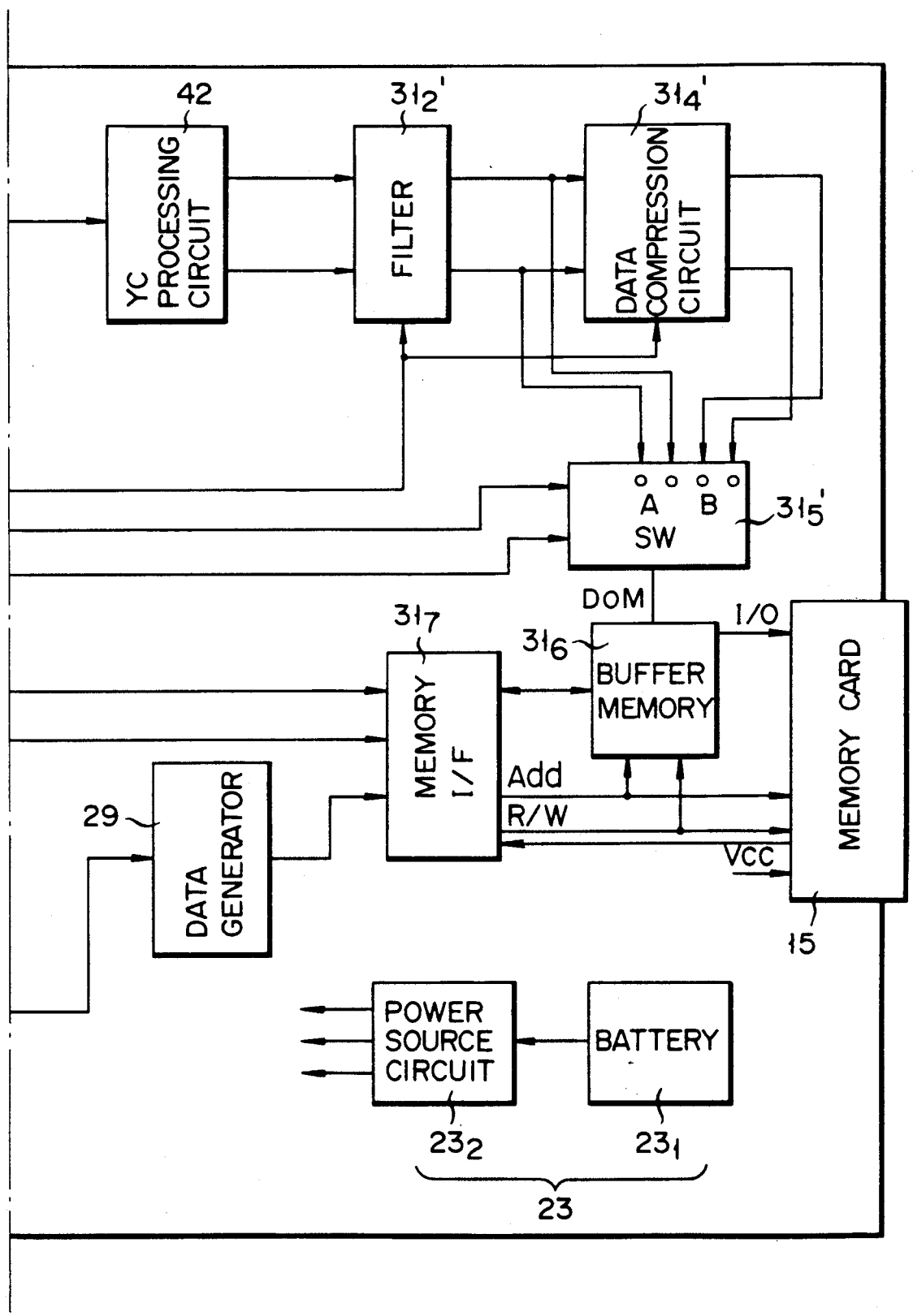
Figure 13:
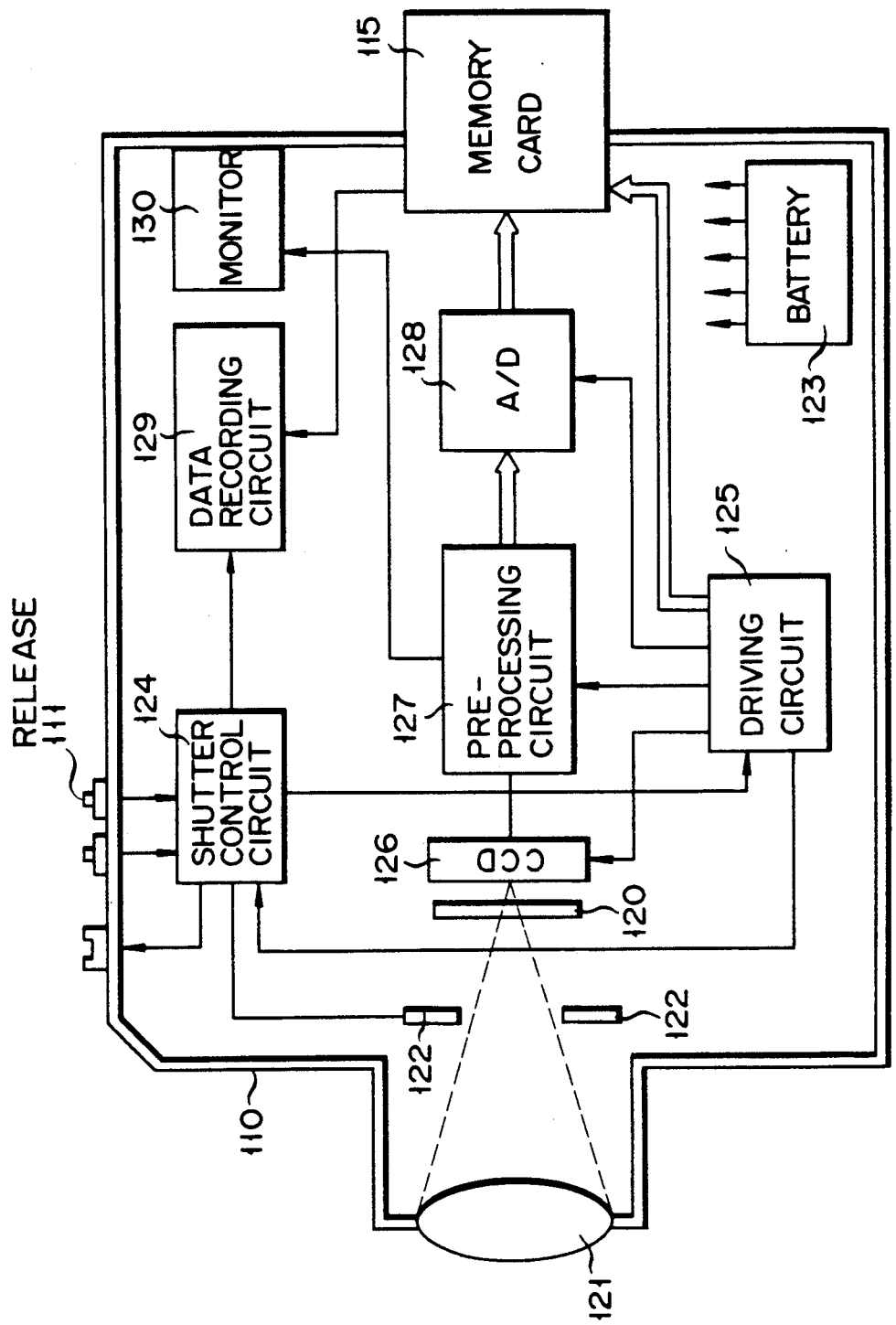
FIG. 13 is a diagram showing the construction of the conventional electronic still camera.

Further, FIGS. 12A and 12B show another construction of an electronic still camera according to another embodiment of this invention. In this embodiment, a section including A/D conversion circuit 28, signal processing circuit $31_1$, filter $31_2$, sub-sampling circuit $31_3$, data compression circuit $31_4$ and switch $31_5$ shown in FIGS. 6A and 6B is omitted, and mixture circuit 41, A/D conversion circuit 28', YC processing circuit 42, filter $31_2'$, data compression circuit $31_4'$, and switch $31_5'$, are used. In this embodiment, R, G and B signals outut from color separation·γ correction·white balance circuit $27_2$ are combined by means of mixer circuit 41, converted into digital form by A/D conversion circuit 28' and then supplied to YC processing circuit 42. A luminance signal and color difference signals are supplied to data compression circuit $31_4'$ via filter $31_2'$. An input to and output from data compression circuit $31_4'$ are selected by switch $31_5'$.

What is claimed is:

1. An electronic still camera adapted to store an image in an semiconductor memory card, comprising:
    imaging means for photoelectrically converting an image into an image signal representative thereof and including a solid state imaging device and optical color filter of different colors with different spectral characteristics arranged on said solid state imaging device;
    signal conversion means for converting the image signal supplied from said imaging means into a luminance signal and two color difference signals and for converting the luminance signal and the two color difference signals into different amounts of image information according to one of a plurality of different data processing modes for different image qualities, the signal conversion means including mode select means for selecting one of the plurality of different modes; and
    recording means for storing image information including the luminance signal and two color difference signals into the semiconductor memory card.

2. An electronic still camera according to claim 1, wherein said signal conversion means has means for converting the luminance signal and the two color difference signals according to a mode in which the luminance signal and the two color difference signals are linearly quantized and then supplied to said recording means.

3. An electronic still camera according to claim 1, wherein said signal conversion means has means for converting the luminance signal and the two color difference signals according to a mode in which the luminance signal and the two color difference signals are subjected to a sub-sampling process for reducing the number of samplings thereof prior to being supplied to said recording means.

4. An electronic still camera according to claim 1, wherein said signal conversion means has means for converting the luminance signal and the two color difference signals according to a mode in which differences between the luminance signal and the two color difference signals and corresponding prediction signals are non-linearly quantized to reduce the number of bits required for each sampling thereof and then supplied to said recording means.

5. An electronic still camera according to claim 1, wherein said signal conversion means has means for converting the luminance signal and the two color difference signals according to a mode in which the luminance signal and the two color difference signals are subjected to a sub-sampling process for reducing the number of samplings thereof and differences between the luminance signal and the two color difference signals and corresponding prediction signals are non-linearly quantized to reduce the number of bits required for each sampling and then supplied to said recording means.

6. An electronic still camera according to claim 1, wherein said recording means includes means for dividing the memory area of said memory card into a plurality of blocks each having a predetermined capacity, and means for storing coded data of the image information corresponding to one frame into at least one of the blocks in which no coded data is stored.

7. An electronic still camera according to claim 6, wherein said recording means includes data recording means for recording the number of blocks used for each frame into said memory card correspondingly to the frame.

8. An electronic still camera according to claim 6, wherein said recording means includes means for allocating block numbers to respective blocks and storing the block number allocated to the first one of the blocks constituting each frame into said memory card.

9. An electronic still camera according to claim 8, wherein said recording means includes means for recording, at the end of each block, information indicating whether the data is completed in the block or continues to a next block.

10. An electronic still camera according to claim 6, wherein said recording means includes means for assigning a block name to each block and storing the block name of a first one of the blocks in each frame.

11. An electronic still camera according to claim 10, wherein said recording means includes means for recording, at the end of each block, information indicating whether the data is completed in the block or continues to a next block.

12. An image recording method of an electronic still camera for coding an image signal and storing the coded signal into a semiconductor memory card in a digital form comprising:
   a first signal conversion step for converting the image signal into a luminance signal and two color difference signals;
   a second signal conversion step for converting the luminance signal and two color difference signals into different amounts of image information according to a selected one of a plurality of different data processing modes to select different image qualities; and
   a recording step of recording the image information including the luminance signal and two color difference signals into said semiconductor memory card.

13. An image recording method of an electronic still camera according to claim 12, wherein said second signal conversion step has a mode in which the luminance signal and two color difference signals are linearly quantized and then used for said recording step.

14. An image recording method of an electronic still camera according to claim 12, wherein said second signal conversion step has a mode in which the luminance signal and two color difference signals are subjected to a sub-sampling process for reducing the number of samplings thereof and then used for said recording step.

15. An image recording method of an electronic still camera according to claim 12, wherein said second signal conversion step has a mode in which differences between the luminance signal and two color difference signals and corresponding prediction signals are non-linearly quantized to reduce the number of bits required for each sampling and then used for said recording step.

16. An image recording method of an electronic still camera according to claim 12, wherein said second signal conversion step has a mode in which the luminance signal and two color difference signals are subjected to a sub-sampling process for reducing the number of samplings thereof and differences between the luminance signal and two color difference signals and corresponding prediction signals are non-linearly quantized to reduce the number of bits required for each sampling and then used for said recording step.

17. An image recording method of an electronic still camera according to claim 12, wherein said memory card has a memory area, and said recording step includes a step for dividing the memory area of said memory card into a plurality of blocks each having a predetermined capacity, and storing coded data of the image information of one frame into one or more of each blocks.

18. An image recording method of an electronic still camera according to claim 17, wherein said recording step includes a data recording step for recording the number of blocks used for each frame of coded data into said memory card correspondingly to the frame.

19. An image recording method of an electronic still camera according to claim 18, wherein said data recording step includes a step for allocating block numbers to respective blocks and storing the block number allocated to the first block of each frame into said memory card.

20. An image recording method of an electronic still camera according to claim 19, wherein said data recording step includes a step for recording, at the end of each block, information indicating whether the image data is completed in the block or continues to the next block.

21. An image recording method of an electronic still camera according to claim 18, wherein said data recording step includes a step for assigning a block name to each block and storing the block name of the first block in each frame.

22. An image recording method of an electronic still camera according to claim 21, wherein said data recording step includes a step for recording, at the end of each block, information indicating whether the image data is completed in the block or continues to the next block.

23. A reproducing device for reading out image data of a memory cared for storing image data obtained by coding image information including a luminance signal and two color difference signals in accordance with a selected one of a plurality of different data processing modes which each convert the image data into different amounts of information, said memory card being divided into a plurality of blocks each having a preset capacity, comprising:
   readout means for reading out preset image data from said memory card;
   mode determination means for determining a mode for the readout of the image data; and
   signal processing means for restoring the image into original image information according to the mode, and for deriving an image displaying signal from the image information.

24. A reproducing device according to claim 23, further comprising means for indicating that the block corresponding to the image data of a selected frame is invalid.

* * * * *